United States Patent [19]

Ideno

[11] Patent Number: 4,953,208
[45] Date of Patent: Aug. 28, 1990

[54] CATV SYSTEM TRANSMITTING A SCRAMBLED TELEVISION SIGNAL

[75] Inventor: Akira Ideno, Tokyo, Japan
[73] Assignee: Pioneer Electronic Corporation, Tokyo, Japan
[21] Appl. No.: 448,442
[22] Filed: Dec. 11, 1989
[30] Foreign Application Priority Data Apr. 28, 1989 [JP] Japan ................................. 1-107875

[51] Int. Cl.$^5$ .............................................. H04K 1/00
[52] U.S. Cl. ...................................... 380/15; 380/19; 380/20
[58] Field of Search ....................... 380/20, 15, 19, 10, 380/9; 358/86; 455/3

[56] References Cited

U.S. PATENT DOCUMENTS

| | | |
|---|---|---|
| 3,801,732 | 4/1974 | Reeves . |
| 4,064,536 | 12/1977 | Saeki et al. ............................ 380/15 |
| 4,338,628 | 7/1982 | Payne et al. . |
| 4,353,088 | 10/1982 | dea Toonder et al. . |
| 4,571,615 | 2/1986 | Robbins et al. . |
| 4,691,354 | 9/1987 | Palminteri ............................ 380/15 |
| 4,794,643 | 12/1988 | Saeki et al. ............................ 380/15 |
| 4,839,922 | 6/1989 | Imasaki et al. ........................ 380/15 |

Primary Examiner—Thomas H. Tarcza
Assistant Examiner—David Cain
Attorney, Agent, or Firm—Sughrue, Mion, Zinn, Macpeak & Seas

[57] ABSTRACT

A method of scrambling a television signal is provided in which, during a horizontal blanking interval and during a vertical blanking interval, a video signal is compressed and a key signal containing information concerning the compression is superimposed on an audio signal in the horizontal blanking period. The method is characterized by superimposing a pseudo-key signal on an audio signal in the vertical blanking interval, making the key signal contain information concerning the position of a vertical blanking interval, and fixing a video signal in a predetermined number of horizontal scanning periods before a vertical synchronizing signal portion in the vertical blanking interval at a constant level while eliminating color bursts in a predetermined number of horizontal scanning periods before and after the vertical synchronizing signal portion in the vertical blanking interval. In this way, unauthorized users are prohibited from receiving the signal, and unauthorized access is made difficult.

8 Claims, 12 Drawing Sheets

FIELD 1

| VIDEO SYNC | IN-BAND DATA | DATA CONTENTS |
|---|---|---|
| 23~31 | D0 D1~D8 | TIMING MODE DATA |
| 32~39 | D9~D16 | MULTI-MODE DATA |
| 40~47 | D17~D24 | TAG DATA |
| 48~55 | D25~D32 | IPPV EVENT CODE |
| 56~63 | D33~D40 | CODE 0000 |
| 64~71 | D41~D48 | 00000000 |
| 72~79 | D49~D56 | 00000000 |
| ≀ ≀ | | |
| 175~182 | D152~D159 | START FRAME |
| 183~190 | D160~D167 | START FRAME |
| 191~198 | D168~D175 | VBI START DATA |
| 199~206 | D176~D183 | COMPRESSION DATA |
| 207~214 | D184~D191 | |
| ≀ ≀ | | |
| 255~262 | D232~D239 | |
| 263~270 | D240~D247 | |
| 271~278 | D248~D255 | |
| 279~284 | D256~D261 | |

FIELD 2

| VIDEO SYNC | IN-BAND DATA | DATA CONTENTS |
|---|---|---|
| 285~293 | D'0 D'1~D'8 | TIMING MODE DATA |
| 294~301 | D'9~D'16 | MULTI-MODE DATA |
| 302~309 | D'17~D'24 | TAG DATA |
| 310~317 | D'25~D'32 | IPPV EVENT CODE |
| 318~325 | D'33~D'40 | CODE 0000 |
| 326~333 | D'41~D'48 | 00000000 |
| 334~341 | D'49~D'56 | 00000000 |
| ≀ ≀ | | |
| 438~445 | D'153~D'160 | START FRAME |
| 446~453 | D'161~D'168 | START FRAME |
| 454~461 | D'169~D'176 | VBI START DATA |
| 462~469 | D'177~D'184 | COMPRESSION DATA |
| 470~477 | D'185~D'192 | |
| ≀ ≀ | | |
| 518~525 | D'233~D'240 | |
| 1~8 | D'241~D'248 | |
| 9~16 | D'249~D'256 | |
| 17~22 | D'257~D'262 | |

CATV SYSTEM TRANSMITTING A SCRAMBLED TELEVISION SIGNAL

BACKGROUND OF THE INVENTION

The present invention relates to a method of scrambling a television signal in a CATV system to prohibit reception of the television signal by subscribers other than those specified.

In a CATV system, a subscriber contracting to receive chargeable programs pays a charge every month for every program or for every channel. It is therefore necessary to prohibit reception for those who have not contracted for the service and who intend to gain unauthorized access. In the CATV system, unauthorized access is prevented since a television signal to be transmitted is subject to scrambling in which synchronizing signals in the television signal are compressed with a compression ratio which is changed, for example, every 15V (frame) period to thereby disturb a picture so that a normal picture cannot be reproduced unless descrambling processing is performed on the reception side.

Figure 12:
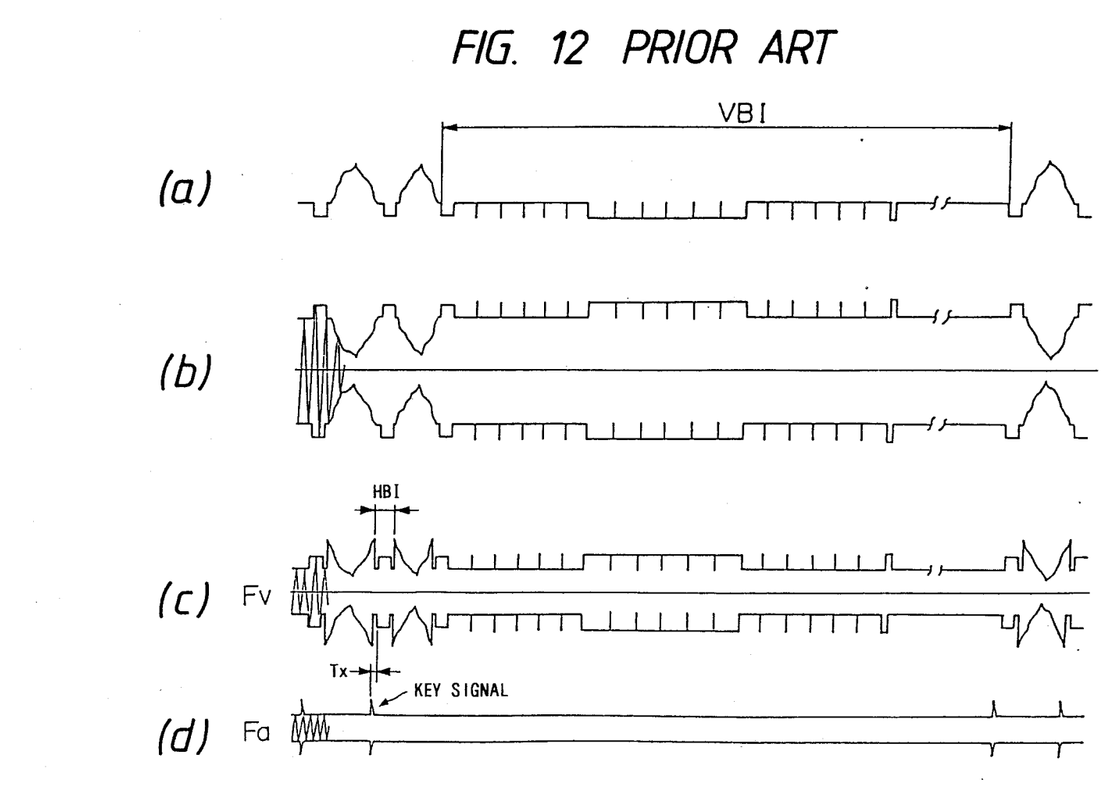
FIG. 12 is a diagram for explaining a conventional scrambling method.

FIG. 12 shows a conventional method of scrambling a television signal. In a CATV center, which is where transmission occurs, a television signal having a base band shown in FIG. 12(a) is converted into a television IF signal as shown in FIG. 12(b). After the conversion, during a horizontal blanking interval (HBI), consisting of a front porch, horizontal synchronizing period and back porch, and a vertical blanking interval (VBI), a video signal is compressed with the same compression ratio as shown in FIG. 12(c), and a key signal containing the compression ratio data of the television signal is superposed on an audio IF signal in synchronism with the horizontal synchronizing signal of the video signal as shown in FIG. 12(d). Each key signal precedes the horizontal synchronizing signal by 3 to 20 $\mu$sec (Tx).

In a CATV home terminal unit having a descrambling function for a television signal which has been scrambled in a manner as described above, the incoming transmitted key signal is detected, the compression data is extracted and decoded, an expansion pulse having an amplitude based on the decoded data is generated at the time of the key signal, and the television signal compressed at the transmission side is expanded in the blanking intervals by using the expansion pulse to thereby make it possible to see a normal picture.

In the case of a television signal which has been scrambled by the foregoing scrambling method, however, it is possible for a CATV terminal unit other than a licensed one to obtain unauthorized access if descrambling is made to a certain extent.

One of the descrambling methods for unauthorized CATV access is as follows. A VBI is detected by a method wherein a key signal which is superimposed by AM modulation on an audio signal in every horizontal blanking interval (HBI), but which is not superimposed on the audio signal in a VBI, is passed through an integrating circuit after AM-detection, or by any other method. A video signal expanded on the basis of the detected VBI is detected to perform synchronizing signal separation to thereby obtain synchronizing signals in the VBI. A free-running timing generator operates thereafter in synchronism with the synchronizing signals. The amplitude of a pulse generated from the free-running timing generator is adjusted on the basis of the integral level of the synchronizing signals in the VBI to form an expansion pulse to carry out descrambling, so as to easily gain unauthorized picture access.

Figure 13:
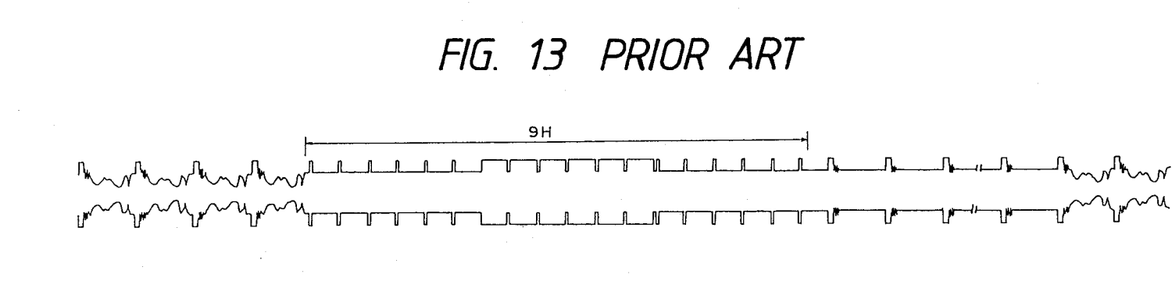
FIG. 13 is a waveform showing a general configuration of a video signal.

Another method is available in which one seeking unauthorized access uses the fact that a color burst of 3.58 MHZ is inserted after a horizontal synchronizing signal except in a vertical synchronizing signal portion of a 9H period in a VBI, as apparent from a video IF signal shown in FIG. 13. A video signal is detected to find that the above color burst does not exist in a predetermined time or that the color burst appears after a predetermined time in which the color burst does not exist, to thereby detect the vertical synchronizing signal. Based on the detected vertical synchronizing signal, an expansion pulse for expanding the video signal in the HBI and the VBI is produced to thereby perform descrambling to carry out unauthorized picture access.

SUMMARY OF THE INVENTION

In view of the foregoing problem in the prior art, an object of the present invention is to provide a CATV system transmitting a scrambled television signal in which unauthorized access cannot be easily performed.

In order to attain the above object, according to the present invention, a method of scrambling a television signal is provided in which, in a horizontal blanking interval and a vertical blanking interval, a video signal is compressed and a key signal containing information concerning the compression is superimposed on an audio signal in the horizontal blanking period. The method is characterized by superimposing a pseudo-key signal on an audio signal in the vertical blanking interval; making the key signal contain information concerning the position of the vertical blanking interval; and fixing a video signal in a predetermined number of horizontal scanning periods before a vertical synchronizing signal portion in the vertical blanking interval at a constant level, while eliminating color bursts in a predetermined number of horizontal scanning periods before and after the vertical synchronizing signal in the vertical blanking interval.

In the aforementioned configuration, a pseudo-key signal is superimposed on an audio signal in a vertical blanking interval (VBI). Accordingly, the VBI cannot be detected even though the audio signal is detected. Further, the video signal cannot be expanded in the VBI because there is no reference for generating an expansion signal for expanding the video signal. Accordingly, the free-running timing generator for generating a timing signal for expanding the compressed video signal in the HBI cannot be operated because a synchronizing signal in the VBI cannot be obtained. In short, it is impossible to form an expansion signal for expanding the video signal in the horizontal blanking interval and vertical blanking interval compressed by scrambling. Consequently, unauthorized picture access is difficult to achieve.

Further, because color bursts inserted in a predetermined number of horizontal scanning periods before and after the vertical synchronizing signal portion in the aforementioned vertical blanking interval are removed, and, at the same time, a video signal provided in a predetermined number of horizontal scanning periods before the vertical synchronizing signal portion is fixed to a constant level, the timing of expansion pulses generated in the VBI based on the detection of the color burst is shifted from the normal position in the VBI. Consequently, descrambling sufficient to obtain a normal picture is made impossible.

DESCRIPTION OF THE PREFERRED EMBODIMENTS

A preferred embodiment of the present invention is described hereunder with reference to the drawings.

Figure 1:
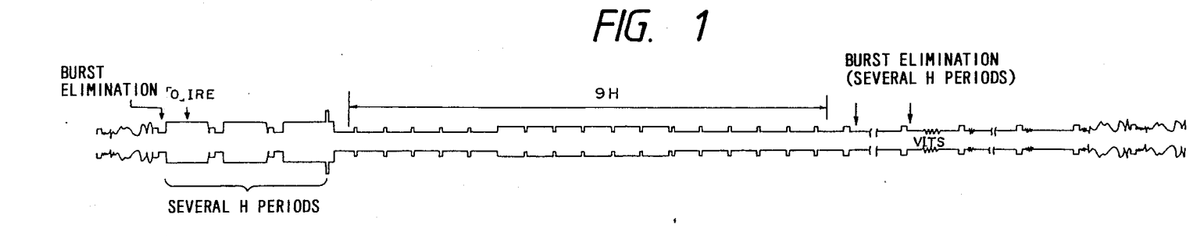
FIG. 1 is a waveform showing a television signal scrambled by a method according to the present invention.
Figure 2:
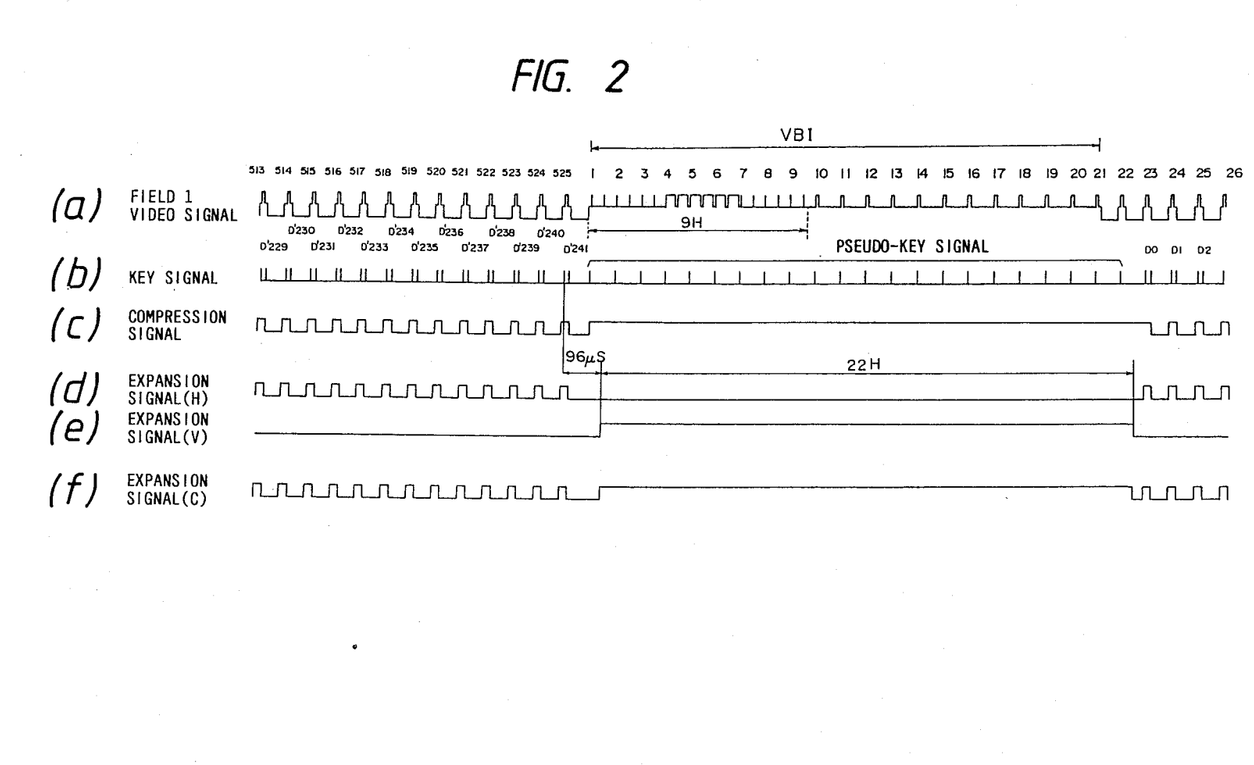
FIGS. 2 and 3 are diagrams for explaining a method of scrambling a television signal according to the invention and a method of descrambling the scrambled television signal.
Figure 3:
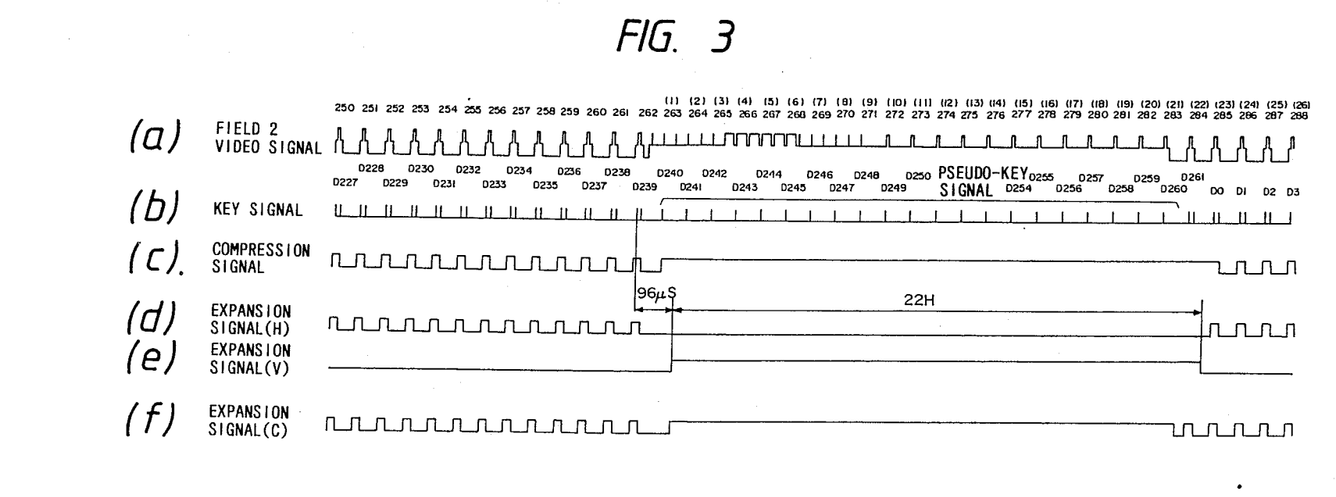

FIG. 1 shows a signal scrambled by compressing the video signal in the horizontal blanking interval (HBI) and the vertical blanking interval (VBI) with a television signal scrambling method according to the present invention. With respect to the signal shown in FIG. 1, an IF signal of the video signal in FIGS. 2(a) and 3(a), respectively, showing the front portions of fields 1 and 2, is compressed based on a compression signal as shown in FIGS. 2(c) and 3(c). A color burst signal and a picture portion are removed during several horizontal (H) scanning periods (for example, 3 H) just before a vertical synchronizing signal portion of 9 H in the video signal. A color burst signal is removed during several horizontal scanning periods just after the vertical synchronizing signal portion.

As shown in FIGS. 2(a), 2(b) and 3(a), 3(b), a pseudo-key signal is inserted into an interval of an audio signal corresponding to the VBI of the video signal with the same frequency as that of a key signal in other intervals. Position data as in-band data for expressing the position of the VBI is added to the key signal. The aforementioned key signal and pseudo-key signal are superimposed on an audio signal in synchronism with the horizontal synchronizing signal through amplitude modulation in the same manner as the conventional key signal.

Figure 4:
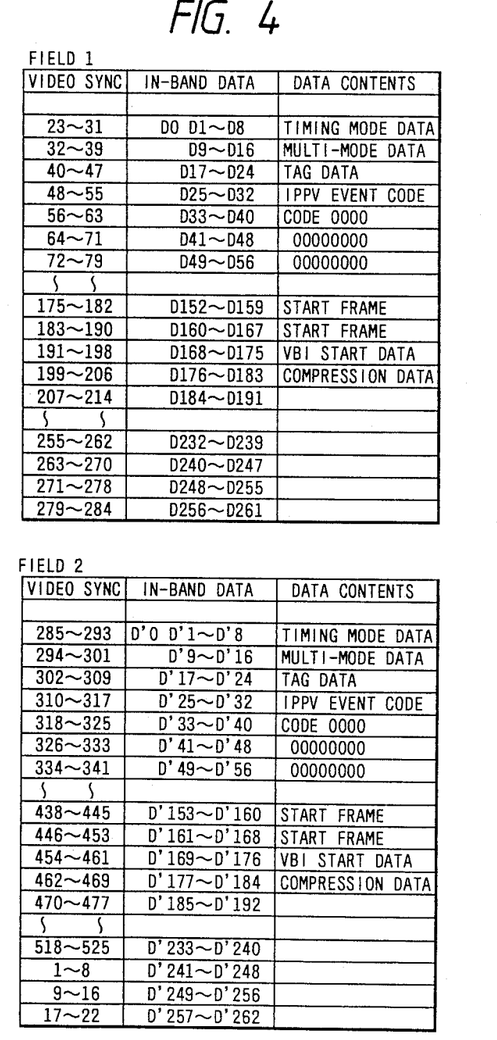
FIG. 4 is a diagram showing video synchronizing signal versus in-band data.

The correspondence between in-band data and the video synchronizing signal is shown in FIG. 4 in which, for convenience of description, numbers 1 through 525 are given to video synchronizing signals in the order numbered from the VBI of the previous frames. Numbers D0 through D261 are given to in-band data corresponding to the video synchronizing signals 23 through 284. Numbers D'0 through D'262 are given to in-band data corresponding to the video synchronizing signals 285 through 22. The in-band data, D152 through D167 and D'153 through D'168, express start frames superimposed on an audio signal and are transmitted together with the audio signal. The in-band data, D168 through D175 and D'169 through D'176, express VBI start data superimposed on an audio signal and transmitted together with the audio signal. The in-band data, D176 through D183 and D'177 through D'184, express compression data superimposed on an audio signal and transmitted together with the audio signal.

Other in-band data, such as timing mode data (expressing time from the key of a key signal to a horizontal synchronizing signal, being selected from 0, 4, 8, 12 and 16 μsec for every field and informing the designated time to a terminal side), multi-mode data (expressing the mode of compression level), tag data, IPPV (impulse pay per view) event data, and the like, are superimposed on an audio signal and transmitted together with the audio signal.

The video signal scrambled through compression based on the compression signal as shown in FIGS. 2(c) and 3(c) is received by a terminal unit. To perform descrambling, expansion signals as shown in FIGS. 2(d)–(f) and 3(d)–(f) are generated in the terminal based on the VBI start data and compression data in the in-band data.

An example of the configuration of a center-side apparatus for realizing the television signal scrambling method according to the present invention is described with reference to FIGS. 5 through 7.

Figure 5:
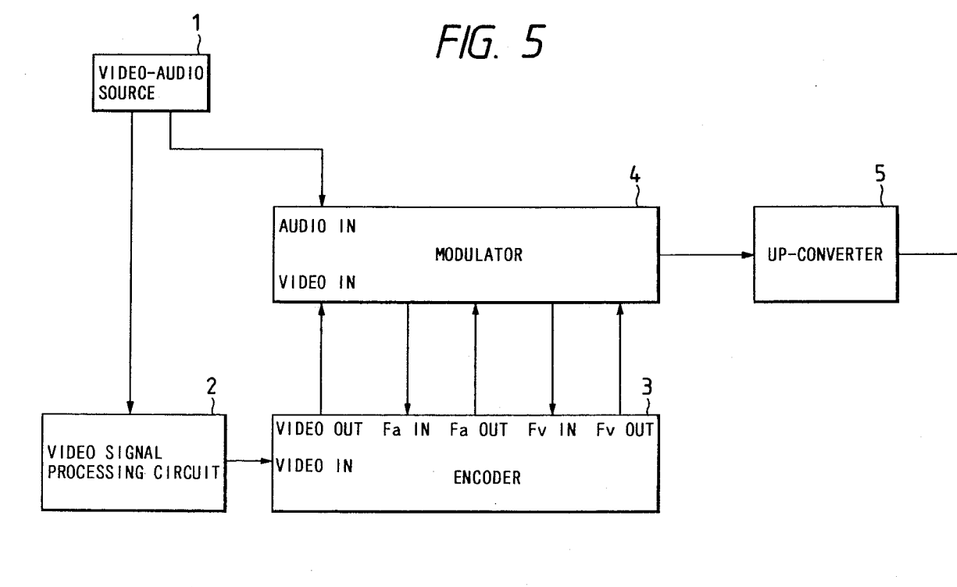
FIG. 5 is a block diagram showing the configuration of a CATV center using the method of the invention for performing scrambling.

In FIG. 5, the reference numeral 1 designates a video-audio source such as a video tape recorder, a video disc player, or the like. The video signal from the video-audio source 1 is supplied to the video input VIDEO-IN of an encoder 3 for performing scrambling through a video signal processing circuit 2. A part of the video signal is passed through the encoder 3 and supplied from the video output VIDEO-OUT thereof to the video input VIDEO-IN of a modulator 4. The video signal processing circuit 2 serves to remove both a color burst signal and a picture portion in several H periods, for example, 3 H, before a V synchronizing signal portion of 9 H and also serves to remove a color burst signal (just before a VITS signal (verical interval test signal) in a predetermined position) in several H periods after the V synchronizing signal portion of 9 H.

The modulator 4 converts the video signal supplied to the video input VIDEO-IN and the audio signal supplied to the audio input AUDIO-IN into IF signals, respectively. The video IF signal Fv and audio IF signal Fa thus modulated in the modulator 4 are returned to the encoder 3. In the encoder 3, the video IF signal Fv in the horizontal blanking interval (HBI) and vertical blanking interval (VBI) are compressed at predetermined compression ratios based on the compression signal as shown in FIGS. 2(c) and 3(c). Further, a key signal and a pseudo-key signal are superimposed on the audio IF signal Fa in the HBI and VBI in synchronism with the video synchronizing signal of the video signal.

The video IF signal Fv compressed in the HBI and VBI and the audio IF signal Fa carrying the key and pseudo-key signals superimposed thereon as described above are supplied from the encoder 3 to the modulator 4. After the video IF signal Fv and the audio IF signal Fa are mixed in the modulator 4, the mixed signal is supplied to an up-converter 5. In the up-converter 5, the mixed signal is converted into a signal having a predetermined frequency and then sent out through a transmission line such as a coaxial cable.

Figure 6:
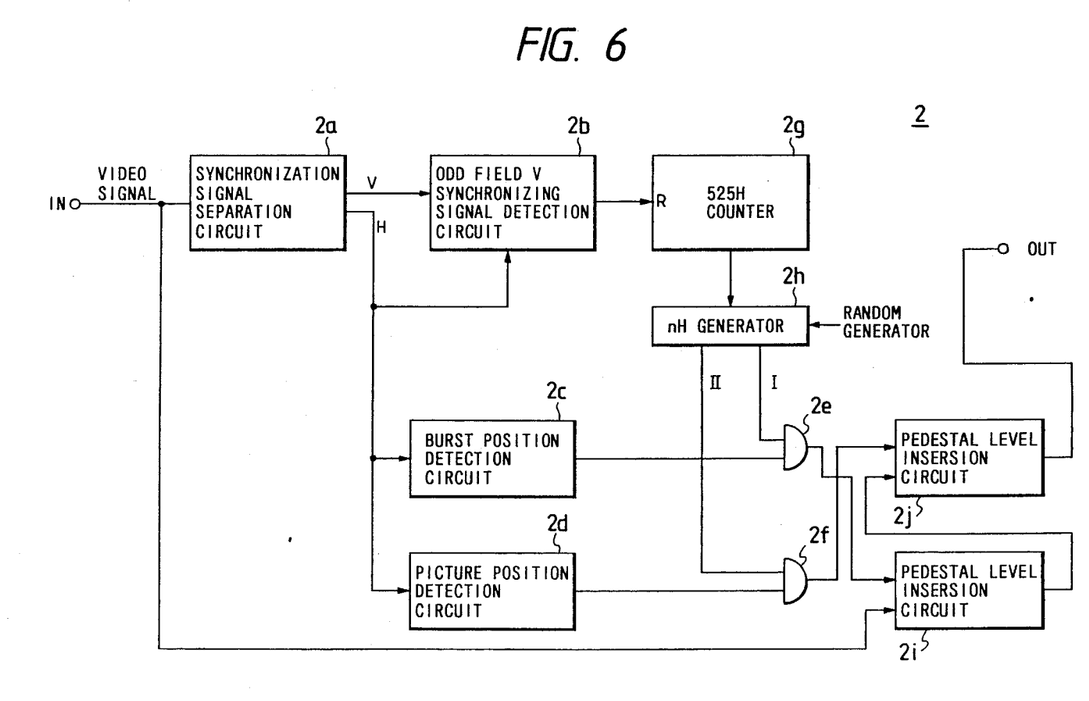
FIG. 6 is a block diagram showing a specific example of a part of the CATV center depicted in FIG. 5.

For example, a circuit having such a configuration as shown in FIG. 6 is used as the video signal processing circuit 2. The video signal from the video-audio source 1 is supplied to a synchronizing signal separation circuit 2a in which a horizontal (H) synchronizing signal and a vertical (V) synchronizing signal are sampled and sent out. The H synchronizing signal is supplied to an odd field V synchronizing signal detection circuit 2b, a burst position detection circuit 2c and a picture position detection circuit 2d. The V synchronizing signal is supplied to an odd field V synchronizing signal detection circuit 2b.

The burst position detection circuit 2c supplies an AND gate 2e with a detection signal, continued for a time corresponding to the duration of the color burst, a predetermined time after the input of the H synchronizing signal based on the predetermined positional relation between the H synchronizing signal and the color burst. The picture position detection circuit 2d supplies an AND gate 2f with a detection signal, continued for a time corresponding to the duration of the picture signal, a predetermined time after the input of the H synchronizing signal based on the predetermined positional relation between the H synchronizing signal and the picture portion.

The odd field V synchronizing signal detection circuit 2b detects the odd-field V synchronizing signal by clocking the time, based on the H synchronizing signal, after the input of the V synchronizing signal based on the fact that the VBI time of the odd field is different from that of the even field. The detection signal from the odd field V synchronizing signal detection circuit 2b is applied to the reset input of a 525H counter 2g.

The 525H counter 2g is initialized by the resetting and applies the count to an nH generator 2h. In the case of FIG. 1, the nH generator 2h generates a gate signal at the output I thereof to be supplied to the AND gate 2e, and also generates a gate signal at the output II thereof to be supplied to the AND gate 2f, based on the count of the 525H counter 2g. The level of the gate signal generated at the output I is high for every field for a period from 3H before the V synchronizing signal portion of 9H to starting of the VITS signal (10H from the end of the V synchronizing signal portion in the case of field 1). The level of the gate signal generated at the output II is high for a period from 3H before the V synchronizing signal portion of 9H to starting of the V synchronizing signal portion. The lengths of the gate signals generated by the nH generator 2h can be changed at random using random data generated by a random generator.

In short, the AND gate 2e outputs a high level signal during every color burst period in the period from 3H before the V synchronizing signal portion to starting of the VITS signal, in response to the detection of the H synchronizing signals. The AND gate 2f outputs a signal turned to a high level during every picture period in the period from 3H before the V synchronizing signal portion to starting of the V synchronizing signal portion, in response to the detection of the H synchronizing signals. The signals output from the AND gates 2e and 2f are supplied to pedestal level insertion circuits 2i and 2j, respectively.

When the high-level signal is received from the AND gate 2e, the pedestal level insertion circuit 2i gives a pedestal level to the video signal received at the other input and removes color bursts. When the high-level signal is received from the AND gate 2f, the other pedestal level insertion circuit 2j turns the color-burst-eliminated video signal received at the other input from the pedestal level insertion circuit 2i, to "0" IRE. In short, the video signal in which the color burst and the picture portion have been removed from the portions before and after the V synchronizing signal portion as shown in FIG. 1 is produced at the output of the pedestal level insertion circuit 2j.

Figure 7:
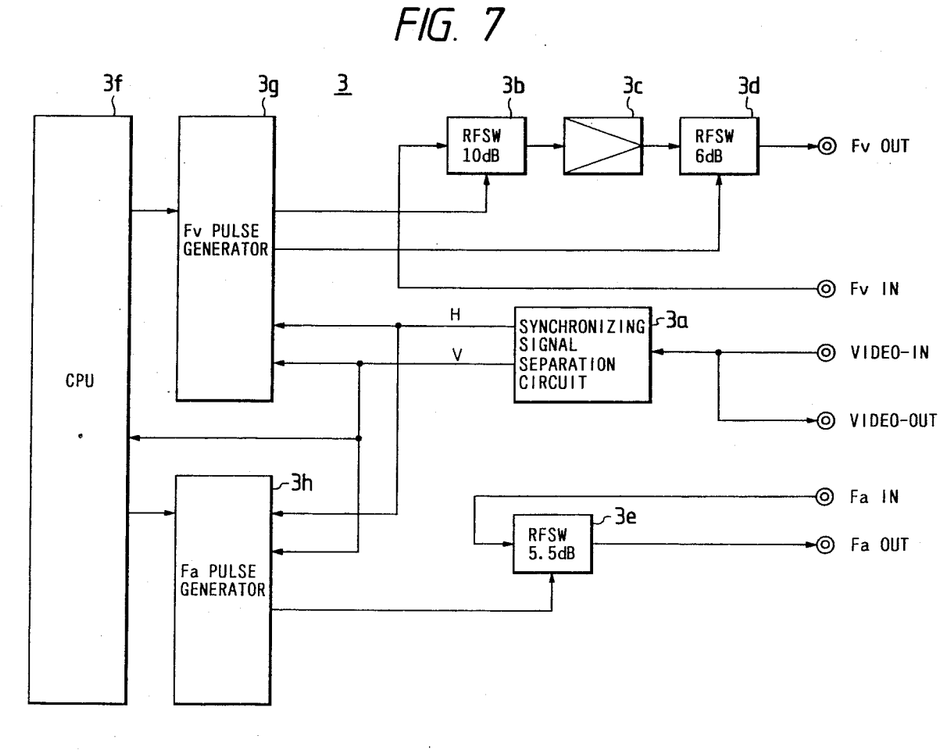
FIG. 7 is a block diagram showing a specific example of another part of the CATV center depicted in FIG. 5.

For example, a circuit having such a configuration as shown in FIG. 7 is used as the encoder 3. In FIG. 7, the video signal received at the input VIDEO-IN from the video signal processing circuit 2 is supplied to a synchronizing signal separation circuit 3a, in which an H synchronizing signal and a V synchronizing signal are separated and extracted from the video signal. The video IF signal Fv received from the modulator 4 is supplied back to the modulator 4 via a 10 dB RF switch 3b, a buffer amplifier 3c and a 6 dB RF switch 3d. The audio IF signal Fa received from the modulator 4 is supplied back to the modulator via a 5.5 dB RF switch 3e.

The 10 dB RF switch 3b and the 6 dB RF switch 3d are turned on and off based on an Fv pulse generated by an Fv pulse generator 3g which operates under control by a CPU 3f. When the switches are turned on, the video IF signal is compressed by 10 dB and 6 dB in the HBI and VBI, respectively. On the other hand, the 5.5 dB RF switch 3e is turned on and off based on an Fa pulse generated by an Fa pulse generator 3h which operates under control by the CPU 3f. When the switch 3e is turned on, the audio IF signal, Fa, is compressed by 5.5 dB in the period other than the periods of insertion of key and pseudo-key signals.

The CPU 3f operates according to a predetermined program to produce in-band data arranged as shown in FIG. 4 corresponding to the V synchronizing signal received from the synchronizing separation circuit 3a to thereby supply the in-band data to the Fa pulse generator 3h. The Fa pulse generator 3h having the in-band data supplied thereto generates, based on the V synchronizing signal and H synchronizing signal from the synchronizing separation circuit 3a, Fa pulses corresponding to the key signal synchronized with the H synchronizing signal and the in-band data that have the relationship as shown in FIG. 4 with the H synchronizing signal. The Fa pulses are supplied to the 5.5 dB RF switch 3e to thereby turn on and off the switch. Consequently, the key and pseudo-key signals including the in-band data are superimposed, through amplitude modulation, on the audio IF signal Fa passing through the 5.5 dB RF switch 3e.

Further, the CPU 3f counts the V synchronizing signal received from the synchronizing separation circuit 3a to establish the ratio of compression in the HBI and VBI to 10 dB, 6 dB or 0 dB corresponding to the input of a predetermined number of V synchronizing signals, uses data relative to the set ratio of compression when generating the in-band data, and supplies the data to the Fv pulse generator 3g.

The Fv pulse generator 3g supplied with the H synchronizing signal and V synchronizing signal from the synchronizing signal separation circuit 3a generates Fv pulses to turn on the 10 dB RF switch 3b or 6 dB RF switch 3d in the HBI and VBI of the video IF signal Fv based on these signals and the data concerning the compression ratio given from the CPU 3f. Accordingly, the video IF signal Fv passing through the 10 dB RF switch 3b and 6 dB RF switch 3d is compressed in the HBI and VBI in a predetermined compression ratio.

An example of the configuration of a CATV home terminal unit in which a signal scrambled in the CATV center side as described above with reference to FIGS. 5 through 7 and transmitted through a transmission line is descrambled will be described hereunder with reference to FIG. 8.

Figure 8:
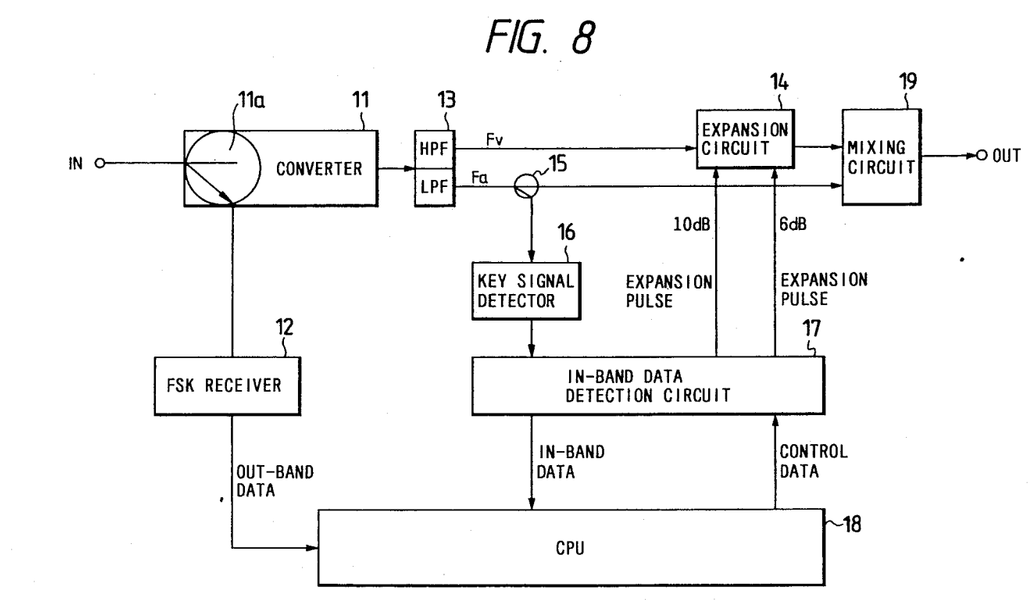
FIG. 8 is a block diagram showing the configuration of a CATV home terminal unit for descrambling a signal scrambled by the method of the invention.

In FIG. 8, the signal transmitted through a transmission line is received in a converter 11 through an input terminal IN. The signal is branched by a branching device 11a at the inlet portion of the converter 11, so that a part of the signal is supplied to an FSK receiver which serves to extract out-band data. The converter 11 selects a specific channel and performs frequency conversion on a signal in the selected channel to form an IF signal as an output signal. The IF signal obtained at the output of the converter 11 is supplied to a filter circuit 13 composed of a HPF and a LPF. In the filter circuit, the IF signal is separated into a high-band video IF signal Fv and a low-band audio IF signal Fa.

The video IF signal Fv separated by the filter 13 is supplied to an expansion circuit 14 in which the signal is descrambled. On the other hand, the audio IF signal is branched by a branching device 15, so that a part of the signal is supplied to a key signal detector 16 in which the key signal superimposed on the audio IF signal is extracted by use of envelope detecting means. The key signal extracted by the key signal detector 16 is supplied to an in-band data detection circuit 17 in which in-band data contained in the key signal is detected. A part of the in-band data thus detected is used for generation of 6 dB and 10 dB expansion pulses. The other part of the in-band data is supplied, together with the out-band data from the FSK receiver 12, to a CPU 18 which operates according to a predetermined program, so that the other part of the in-band data is processed by the CPU 18. The CPU 18 supplied with the in-band data and out-band data generates a variety of control data.

Upon reception of the key signal from the key signal detector 16, the in-band data detection circuit 17 generates 6 dB or 10 dB expansion pulses in synchronism with the key signal to feed these pulse signals to the expansion circuit 14. The expansion circuit 14 expands the compressed video IF signal in the horizontal and vertical blanking interval based on the expansion pulse having an amplitude corresponding to the expansion ratio, so that the signal is descrambled to be returned to the video IF signal before scrambling.

The video IF signal thus descrambled and the audio IF signal passed through the branching device 15 are mixed by a mixing circuit 19, and the mixed signal is output from the output terminal OUT.

Figure 9:
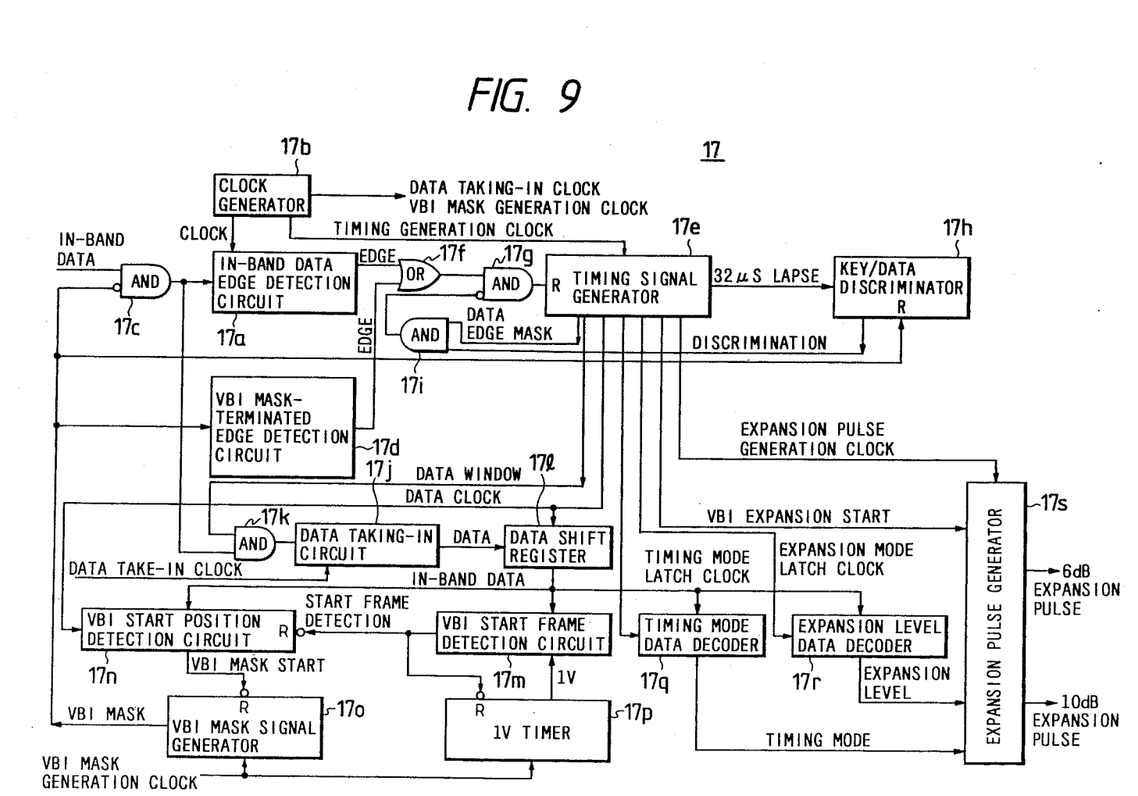
FIG. 9 is a block diagram showing a specific configuration of a circuit as a part of the CATV terminal depicted in FIG. 8.

FIG. 9 shows a specific example of the configuration of the in-band data detection circuit 17. In FIG. 9, the reference numeral 17a designates an in-band data edge detection circuit which operates based on a clock signal generated from a clock generator 17b. The circuit 17a serves to detect the rising edge of the key signal composed of a key and data and given from the key signal detector 16 through an AND gate 17c. The function of the circuit 17a is interrupted by a VBI mask signal which is given to an inverted input of the AND gate 17c.

The reference numeral 17d designates a VBI mask-terminated edge detection circuit for detecting the end of the VBI masking period. The circuit 17d generates a reset signal for resetting a timing signal generator 17e (which will be described later) on the basis of the in-band data edge detected by the in-band data edge detection circuit 17a and the VBI mask-terminated edge detected by the circuit 17d.

The reference numeral 17e designates a timing signal generator which operates based on the timing generation clock obtained from the clock generator 17b. The timing signal generator 17e is reset based on the reset signal generated by the VBI mask-terminated edge detection circuit 17d and received through an OR gate 17f and an AND gate 17g, so that the generator 17e is initialized. The circuit 17e provides signals to respective portions of the in-band detection circuit 17, such as a data edge mask signal for preventing the edge resetting by data, a data latch clock signal, a data window signal and a data clock signal for taking in data, an expansion pulse generation clock signal, and the like.

The reference numeral 17h designates a key/data discriminator for discriminating between key and data contained in the key signal. The discriminator recognizes the coming key signal based on the fact that the transmission time of the key is different from the transmission time of the data, for example, by 19 $\mu$sec. That is to say, the discriminator recognizes the coming key signal when 32 $\mu$sec has passed after the resetting of the timing signal generator 17e by the in-band data edge, because the period of one horizontal synchronizing interval (1H) is 63.5 $\mu$sec. Accordingly, the relation $(63.5-19) > 63.5/2 \approx 32$ $\mu$sec is established. When the key signal is recognized as described above, the discriminator generates a discrimination signal to thereby control an AND gate 17i. The discriminating operation of the discriminator 17h is carried out once whenever the taking-in of data in a field is started.

The reference numeral 17j designates a data taking-in circuit which operates based on the data take-in clock generated from the clock generator 17b. The circuit 17j serves to take in data every 1 H through an AND gate 17k opened based on the data window signal generated by the timing signal generator 17e based on the discrimination signal from the key/data discriminator 17h.

The reference numeral 17l designates a data shift register which operates based on the data clock generated by the timing signal generator 17e. The shift register serves to shift data taken in every 1H by the data taking-in circuit 17j and is capable of being accessed every 8 bits.

The reference numeral 17m designates a VBI start frame detection circuit which monitors data obtained from the data shift register 17l and detects as a start frame the point in time when at least 16 pieces of data have been all "1" continuously and the next piece of data is "0". A start frame detection signal generated by the circuit is latched for the period of about 1V until the circuit is reset based on a 1V signal generated by a IV timer 17p (which will be described later).

The reference numeral 17n designates a VBI start position detection circuit which operates based on the data clock obtained from the timing signal generator 17e. The circuit latches a VBI start data as one of the in-band data obtained from the data shift register 17l, in response to the input of the start frame detection signal from the VBI start frame detection circuit 17m, detects a VBI start position according to the data based on the data clock and generates a VBI mask start signal to be supplied to a VBI mask signal generator 17o (which will be described later).

The reference numeral 17o designates a VBI mask signal generator which operates based on the VBI mask generation clock obtained from the block generator 17b. The circuit 17o generates a VBI mask signal having a predetermined time length corresponding to the input of the VBI mask start signal from the VBI start position detection circuit 17n.

The reference numeral 17p designates a 1V timer which operates based on the VBI mask generation clock obtained from the clock generator 17b. The timer starts its operation corresponding to the input of the start frame detection signal from the VBI start frame detection circuit 17m. Timer length is established to be shorter (for example, 196H) than the time required for obtaining the data "1" for the next start frame.

The reference numeral 17q designates a timing mode data decoder and 17r an expansion level data decoder. These decoders respectively perform sampling of timing mode data and expansion level data from corresponding portions of the in-band data stored in the data shift register 171, on the basis of the timing mode latch clock obtained from the timing signal generator 17e, and decode the data to feed the decoded data to an expansion pulse generator 17s (which will be described later).

The reference numeral 17s designates an expansion pulse generator which operates 6 dB and 10 dB expansion pulses based on the expansion pulse generation clock and VBI start signal obtained from the timing signal generator 17e, the timing mode signal obtained from the timing mode data decoder 17q and the expansion level signal obtained from the expansion level decoder 17r.

The operation of the in-band data detection circuit 17 constituted as described above will be described hereunder with reference to the timing charts of FIGS. 10 and 11.

The timing signal generator 17e, the data shift register 171, the key/data discriminator 17h and the VBI start frame detection circuit 17m are reset in an initial condition. In such a condition, the AND gate 17c is open because the VBI mask signal is absent. The in-band data (the signal as shown in FIGS. 2(b) and 3(b)) is supplied to the in-band data edge detection circuit 17a through the AND gate 17c, so that the rising edge of key or data in the key signal as shown in FIG. 10(a) is detected. The in-band data edge detection circuit 17a generates an edge signal, as shown in FIG. 10(b), at the output thereof corresponding to the edge detection. In the case of FIG. 10, the edge signal received first is of a key in the key signal. The edge signal is supplied to the AND gate 17g through the OR gate 17f. Because the key/data discriminator 17h is in a reset state, the discrimination signal is absent, so that the output level of the AND gate 17i is low. Accordingly, the AND gate 17g is opened, so that the edge signal is supplied to the timing signal generator 17e through the AND gate 17g.

The edge signal supplied to the timing signal generator 17e serves to reset the timing signal generator 17e and also serves to generate the timing mode latch clock, the expansion mode latch clock, the VBI expansion start signal, and the like, based on its internal count.

Figure 10:
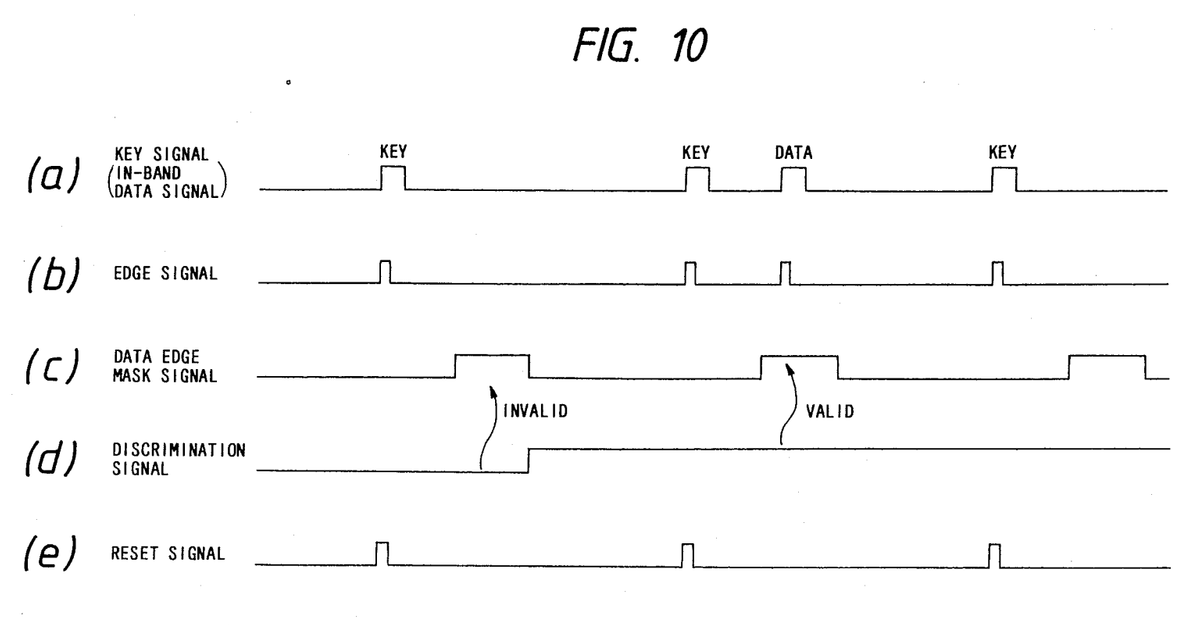
FIGS. 10 and 11 are timing charts used for explaining the operation of the circuit depicted in FIG. 9.
Figure 11:
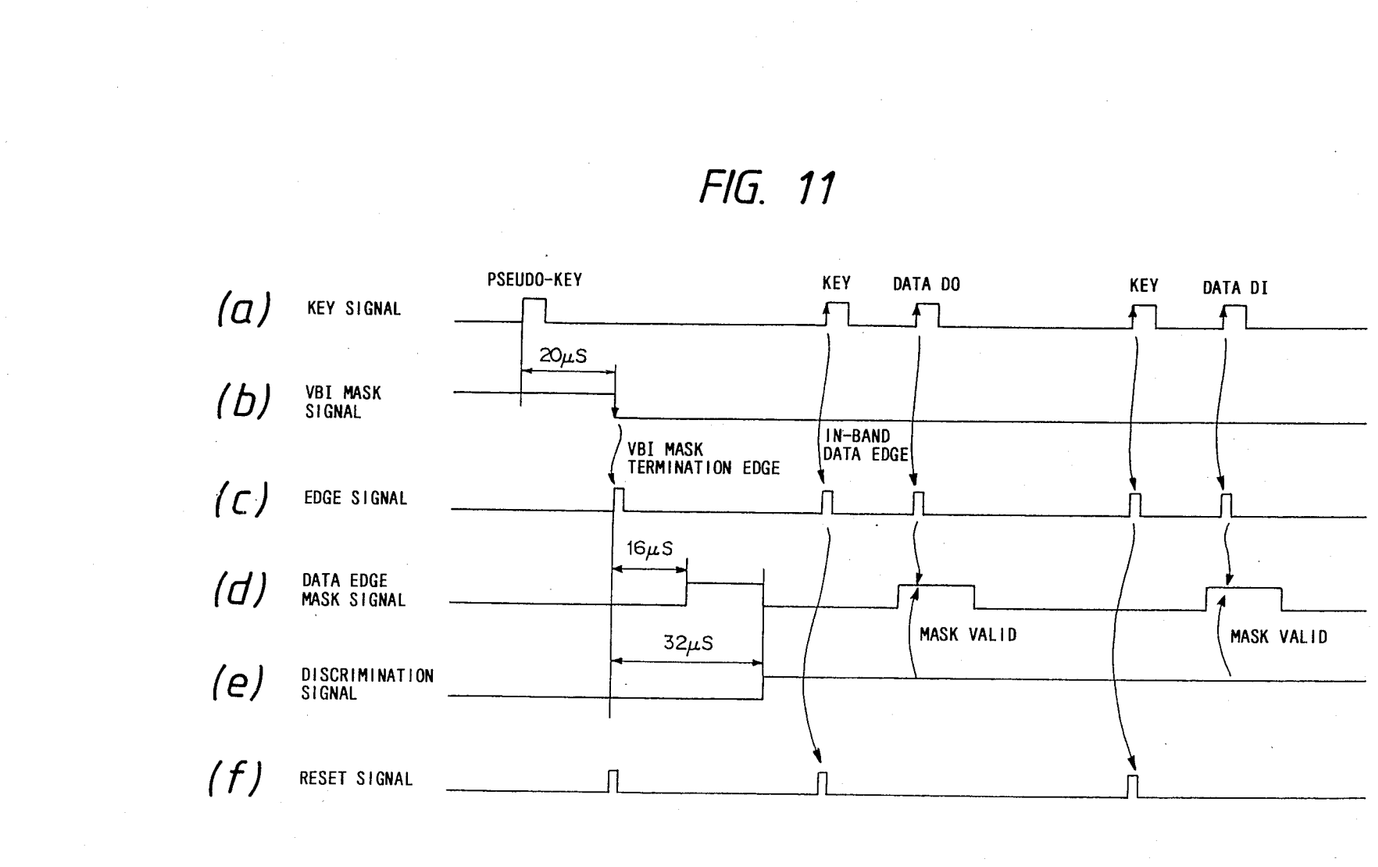

By the aforementioned resetting, the timing signal generator 17e generates a data edge mask signal as shown in FIG. 10(c) after the passage of a predetermined time (for example, 16 μsec). At this time, the discrimination signal from the key/data discriminator 17h is at a low level as shown in FIG. 10(d) and the AND gate 17g is opened. Accordingly, an edge signal based on the next data is also supplied to the timing generator 17e through the AND gate 17g. However, the timing signal generator 17e generates a 32 μsec passage signal 32 μsec after the input of the first edge signal, and, accordingly, the key/data discriminator 17h generates a discrimination signal as shown in FIG. 10(d). As a result, the AND gate 17g is closed whenever a data edge mask signal is generated, so that the edge signal based on data is not supplied to the timing signal generator any more. The level of the discrimination signal is kept low until the key/data discriminator 17h is reset based on the VBI mask signal generated by the VBI mask signal generator 17o.

The timing signal generator 17e, to which edge signals corresponding to keys are successively supplied, generates a data window signal and a data clock in predetermined timing whenever an edge signal is received in the timing generator 17e. The data window signal is supplied to the AND gate 17k as an open signal for the AND gate 17k and the data clock is supplied to the data shift register 171 and the VBI start position detection circuit 17n. When the AND gate 17h is opened based on the data window signal, a data following the key is taken in the data taking-in circuit 17j via the AND gate 17h. The data taken in the data taking-in circuit 17j is soon supplied to the data shift register 171. The data shift register 171 receives data supplied to the input thereof based on the input of the data clock and shifts the data successively.

The data shift register 171, which serves to keep the newest 8-bit data while aborting old data, always supplies the kept data to the VBI start frame detection circuit 17m, the VBI start position detection circuit 17n, the timing mode data decoder 17q and the expansion level data decoder 17r.

The VBI start frame detection circuit 17m always monitors the data obtained from the data shift register 171, so that when a VBI start frame is detected based on the fact that a bit of "0" appears after continuous 16 bits of "1", the circuit 17m generates a start frame detection signal. The start frame detection signal serves to reset both the VBI start position detection circuit 17n and the 1V timer 17p.

The VBI start position detection circuit 17n thus reset takes in VBI start data following the VBI start frame successively from the data shift register 171 based on the data clock and generates a VBI mask start signal after the passage of the time of N×8H synchronizing periods based on the number N of the taken-in VBI start data. The VBI mask start signal is supplied to the VBI mask signal generator 17o, so that the VBI mask signal generator 17o generates a VBI mask signal.

The VBI mask signal is supplied to the AND gate 17c to close it, thereby masking the pseudo-key signal inserted in the VBI. At the same time, the VBI mask signal is supplied to the key/data discriminator 17h to reset it and is also supplied to the VBI mask-terminated edge detection circuit 17d to detect the trailing edge thereof. By the closing of the AND gate 17c, the in-band data is prevented from being supplied to the in-band data edge detection circuit 17a and AND gate 17k while the VBI mask signal exists. Because no edge signal is given to the timing signal generator 17e during the period of the VBI mask signal, the timing signal generator 17e knows that the current period is a VBI mask period.

When the VBI mask signal then falls with the passage of time, the VBI mask-terminated detection circuit 17d detects the edge of the VBI masking and generates an edge signal. The edge signal is supplied to the AND gate 17g through the OR gate 17f. At this time, the AND gate 17g is opened because the key/data discriminator 17h is in a reset state, and, accordingly, the discrimination signal is absent. As a result, the edge signal generated from the VBI mask-terminated detection circuit 17d is supplied to the timing signal generator 17e to thereby reset the timing signal generator 17e.

The operation after the resetting of the timing signal generator 17e is carried out in the same manner as described above with reference to the timing chart of FIG. 10. However, the operation thereafter is carried out based on the end of the VBI mask signal. Accordingly, the expansion pulse generation clock, the VBI expansion start signal, the expansion mode latch clock and the timing mode latch clock generated in predetermined timing by the timing signal generator 17e are issued at normal positions, respectively, so that predetermined data latching and predetermined expansion pulse generating operations can be made.

As described above, a television signal scrambled at the center side can be descrambled by using the in-band data detection circuit 17 as shown in FIG. 9, regardless of insertion of the pseudo-key signal in the VBI.

As described above, according to the scrambling method of the present invention, a pseudo-key signal is superimposed on an audio signal in a vertical blanking interval. Color bursts inserted in a predetermined number of horizontal scanning periods before and after the vertical synchronizing signal portion in the vertical blanking interval are removed. A video signal in a predetermined number of horizontal scanning periods before the vertical synchronizing signal portion is fixed to a constant level. Accordingly, the VBI cannot be detected through detection of the audio signal, and further the invention is useful in preventing unauthorized access using a method of detecting the V synchronizing signal through detection of the picture signal and detection of the presence or absence of the 3.58 MHz burst signal. In short, by removing the burst signals in several H periods before the V synchronizing signal portion and by fixing the picture signal portion to 0 [IRE], the interval detected by the presence or absence of the burst signal is enlarged by the interval corresponding to the removal of the burst signals compared with the original V synchronizing signal portion. If the video signal is expanded based on a signal made by elongating the above signal in the time axis by, for example, a one-shot multivibrator so as to have a width several H periods longer than the VBI, the picture portions in several H periods before the VBI are expanded to be mistaken as the V synchronizing signal portion to thereby erroneously operate a TV receiver.

By removing the burst signals in several H periods after the V synchronizing signal portion and just before the VITS signal, the interval detected by the presence or absence of the burst signal cannot be horizontally synchronized because the VITS signal contains a 3.58 MHz component. Therefore, it becomes impossible to produce H-synchronized expansion pulses except in the VBI based on the fact that the burst signal is synchronized with the H synchronizing signal.

Further, the prevention of unauthorized access is strengthened by a combination of the two.

According to the invention, information concerning the position of the vertical blanking interval is contained in the key signal when scrambling is made. Accordingly, the television signal can be descrambled in the home terminal unit side through the steps of: detecting the vertical blanking interval according to the information concerning the position of the vertical blanking interval contained in the key signal; extracting information concerning the compression contained in the key signal based on the detected vertical blanking interval; generating an expansion signal for expanding the video signal in the horizontal blanking interval and vertical blanking interval according to the extracted information concerning the compression; and expanding the television signal in the horizontal blanking interval and vertical blanking interval based on the expansion signal.

What is claimed is:

1. A method of scrambling a television signal in which a video signal in a horizontal blanking interval and a vertical blanking interval is compressed and a key signal containing information concerning the compression is superimposed on an audio signal in said horizontal blanking interval, wherein the improvement comprises:

superimposing a pseudo-key signal on an audio signal in said vertical blanking interval;

making said key signal contain information concerning the position of said vertical blanking interval; and fixing a video signal at a constant level in a first predetermined number of horizontal scanning periods before a vertical synchronizing signal portion in said vertical blanking interval, while eliminating color bursts at least in said first predetermined number of horizontal scanning periods before said vertical synchronizing signal portion.

2. A method as claimed in claim 1, wherein said color bursts are eliminated also in a second predetermined number of horizontal scanning periods after said vertical synchronizing signal portion.

3. An apparatus for scrambling a television signal in which a video signal in a horizontal blanking interval and a vertical blanking interval is compressed and a key signal containing information concerning the compression is superimposed on an audio signal in said horizontal blanking interval, said apparatus comprising:

video-audio source means for providing a video signal and an audio signal;

video signal processing means for fixing a picture portion at a constant level in a first predetermined period before a vertical synchronizing signal portion, and for removing a color burst signal from said video signal at least in said first predetermined period before said vertical synchronizing signal portion, said video signal processing means being connected to a first output of said video-audio source means;

modulator means for converting said video signal and said audio signal into a video IF signal and an audio IF signal, respectively, said modulator means being connected to a first output of said encoder means and to a second output of said video audio source means;

encoder means for compressing said video IF signal in a horizontal blanking interval and a vertical blanking interval at a predetermined compression ratio, and for superimposing on said audio IF signal a key signal in said horizontal blanking interval and a pseudo-key signal in said vertical blanking interval in synchronism with a horizontal synchronizing signal, said key signal including information concerning the position of said vertical blanking interval; and up-converter means connected to an output of said modulator for transmitting an output of said modulator.

4. An apparatus as claimed in claim 3, wherein said video signal processing means removes said color burst signal from said video signal also in a second predetermined period after said vertical synchronizing signal portion.

5. An apparatus as claimed in claim 3, wherein said video signal processing means comprises:

synchronizing signal separation means having said video signal as an input and sampling out a horizontal synchronizing signal and a vertical synchronizing signal;

burst position detection means having as an input said horizontal synchronizing signal and providing a first detection signal indicating a detection of said color burst;

picture position detection means having as an input said horizontal synchronizing signal and providing a second detection signal indicating a predetermined positional relation between said horizontal synchronizing signal and said picture portion;

odd field vertical synchronizing signal detection means, having as an input said horizontal synchronizing signal, for detecting an odd-field vertical synchronizing signal;

counter means, having as an input said detection signal from said odd field vertical synchronizing signal detection means, for applying a count to a random generator means for generating first and second gate signals, said first gate signal indicating said color burst and said second gate signal indicating said picture portion;

first and second pedestal level insertion means receiving said first and second gate signals, respectively, said first pedestal level insertion means removing color bursts when receiving a high level input, said second pedestal level insertion means having as an input a color-burst-eliminated video signal output from said first pedestal level insertion means and removing predetermined picture portions.

6. An apparatus as claimed in claim 3, wherein said encoder means comprises:

synchronizing signal separation means, receiving an input video signal, for extracting a horizontal synchronizing signal and a vertical synchronizing signal from said video signal;

first and second pulse generating means, having as inputs said horizontal synchronizing signal and said vertical synchronizing signal, for generating pulses;

control means for controlling said first and second pulse generating means and for establishing a compression ratio corresponding to a predetermined number of said vertical synchronizing signals counted by said control means; and first and second switching means, responsive to said first and second pulse generating means, for compressing signals input thereto by predetermined amounts.

7. A CATV system in which, in a center apparatus, a video signal is compressed in a horizontal blanking interval and a vertical blanking interval and a key signal containing information concerning the compression is superimposed on an audio signal in said horizontal blanking interval, and a television signal containing said video and audio signal is transmitted from said center apparatus to each terminal apparatus, wherein said center apparatus comprises:

video signal processing means for fixing a picture portion at a constant level in a first predetermined period before a vertical synchronizing signal portion, and for removing a color burst signal from a video signal at least in said first predetermined period before said vertical synchronizing signal portion; and encoder means for compressing said video signal in a horizontal blanking interval and a vertical blanking interval at a predetermined compression ratio, and for superimposing on an audio signal a key signal in said horizontal blanking interval and a pseudo-key signal in said vertical blanking interval in synchronism with a horizontal synchronizing signal, said key signal including information concerning the position of said vertical blanking interval; and said terminal apparatus comprises:

in-band data detection means for detecting said information concerning the compression and said information concerning the position of said vertical blanking interval; and expansion means for expanding a received video signal in said horizontal blanking interval and said vertical blanking interval on the basis of said detected information concerning the compression and said information concerning the position of said vertical blanking interval.

8. A CATV system as claimed in claim 7, wherein said video signal processing means removes said color burst signal from said video signal also in a second predetermined period after said vertical synchronizing signal portion.

* * * * *